(12) United States Patent
Kawase et al.

(10) Patent No.: US 7,682,742 B2
(45) Date of Patent: Mar. 23, 2010

(54) BATTERY

(75) Inventors: Kenichi Kawase, Fukushima (JP);
Isamu Konishiike, Fukushima (JP);
Masayuki Iwama, Fukushima (JP);
Takakazu Hirose, Fukushima (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 11/457,027

(22) Filed: Jul. 12, 2006

(65) Prior Publication Data

US 2007/0020523 A1    Jan. 25, 2007

(30) Foreign Application Priority Data

Jul. 20, 2005    (JP) .......................... P2005-210622

(51) Int. Cl.
*H01M 4/58* (2006.01)

(52) U.S. Cl. ................... 429/218.1; 429/231.95

(58) Field of Classification Search ................ 429/199, 429/200, 218.1, 231.95
See application file for complete search history.

(56) References Cited

U.S. PATENT DOCUMENTS

| 6,051,340 | A | 4/2000 | Kawakami et al. |
| 6,432,579 | B1 | 8/2002 | Tsuji et al. |
| 2004/0191609 | A1 | 9/2004 | Tamura et al. |
| 2005/0153208 | A1* | 7/2005 | Konishiike et al. .......... 429/245 |
| 2005/0214646 | A1* | 9/2005 | Kubota .................. 429/231.95 |
| 2006/0083987 | A1* | 4/2006 | Konishiike et al. ....... 429/218.1 |

FOREIGN PATENT DOCUMENTS

| JP | 8-050922 | 2/1996 |
| JP | 11-135115 | 5/1999 |
| JP | 2948205 | 9/1999 |
| JP | 2002-352797 | 12/2002 |
| JP | 2004-296096 | 10/2004 |
| JP | 2004349162 | * 12/2004 |

* cited by examiner

*Primary Examiner*—Patrick Ryan
*Assistant Examiner*—Muhammad Siddiquee
(74) *Attorney, Agent, or Firm*—Sonnenschein Nath & Rosenthal LLP

(57) ABSTRACT

A battery capable of improving cycle characteristics is provided. An anode contains Si as an element. Where the Li insertion amount per unit area when the anode is fully charged is A, the Li amount capable of being electronically inserted per unit area of the anode is B, and the maximum utilization ratio C % is (A/B)×100, the maximum utilization ratio C % is in the range from 35% to 85%. The surface roughness Ra value of the anode current collector is 0.2 μm or more.

6 Claims, 3 Drawing Sheets

BATTERY

CROSS REFERENCES TO RELATED APPLICATIONS

The present invention contains subject matter related to Japanese Patent Application JP 2005-210622 filed in the Japanese Patent Office on Jul. 20, 2005, the entire contents of which being incorporated herein by reference.

BACKGROUND OF THE INVENTION

1. Field of the Invention

The present invention relates to a battery having an anode active material layer containing silicon (Si) as an element.

2. Description of the Related Art

In recent years, as mobile devices have been sophisticated and multi-functionalized, a higher capacity of secondary batteries as a power source for the mobile devices has been demanded. As a secondary battery to meet such a demand, there are a lithium ion secondary batteries. In the lithium ion secondary batteries currently in practical use, graphite is used for the anode. Therefore, the battery capacity thereof is in a saturated state, and attaining a greatly high capacity thereof is difficult. Therefore, it has been considered to use silicon or the like for the anode. In these years, forming an anode active material layer on an anode current collector by vapor-phase deposition method or the like has been reported (for example, refer to Japanese Unexamined Patent Application Publication Nos. H08-50922 and H11-135115, and Japanese Patent Publication No. 2948205). Since silicon or the like is largely expanded and shrunk due to charge and discharge, lowering of the cycle characteristics due to pulverization of silicon has been a disadvantage. However, by using vapor-phase deposition method or the like, pulverization can be prevented, and the anode current collector and the anode active material layer can be integrated. Therefore, electron conductivity in the anode becomes greatly favorable, and attaining high performance both in the capacity and the cycle life is expected.

SUMMARY OF THE INVENTION

However, even in the foregoing anode, there has been a disadvantage that the charge and discharge efficiency is lowered due to expansion and shrinkage of silicon due to charge and discharge, and it is difficult to obtain sufficient cycle characteristics.

In view of the foregoing disadvantage, in the invention, it is desirable to provide a battery which can improve the charge and discharge efficiency.

According to an embodiment of the invention, there is provided a battery including a cathode, an anode, and an electrolyte. The anode includes an anode current collector and an anode active material layer which is provided on the anode current collector and contains silicon as an element. The surface roughness Ra value of the anode current collector is 0.2 µm or more. The anode active material layer is alloyed with the anode current collector at least in part of the interface with the anode current collector. Where the lithium (Li) insertion amount per unit area when the anode is fully charged is A, the lithium amount capable of being electrochemically inserted per unit area of the anode is B, and the maximum utilization ratio C % of the anode is (A/B)×100, the maximum utilization ratio C % is in the range from 35% to 85%.

According to the battery of the embodiment of the invention, the maximum utilization ratio C % of the anode is 85% or less. Therefore, the anode active material layer can be prevented from being expanded and shrunk, and the anode active material layer can be prevented from being dropped. Further, since the maximum utilization ratio C % of the anode is 35% or more, side reaction due to unused silicon can be prevented, and the electric potential of the anode when fully charged is lowered and thereby a high quality coating can be formed on the surface. Therefore, charge and discharge efficiency can be improved.

In particular, when the oxygen (O) content in the anode active material layer is 3 atomic % or more, or when at least one or more second layers with the oxygen content larger than that of the first layer are sandwiched between the first layers, the charge and discharge efficiency can be more improved.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment

Figure 1:
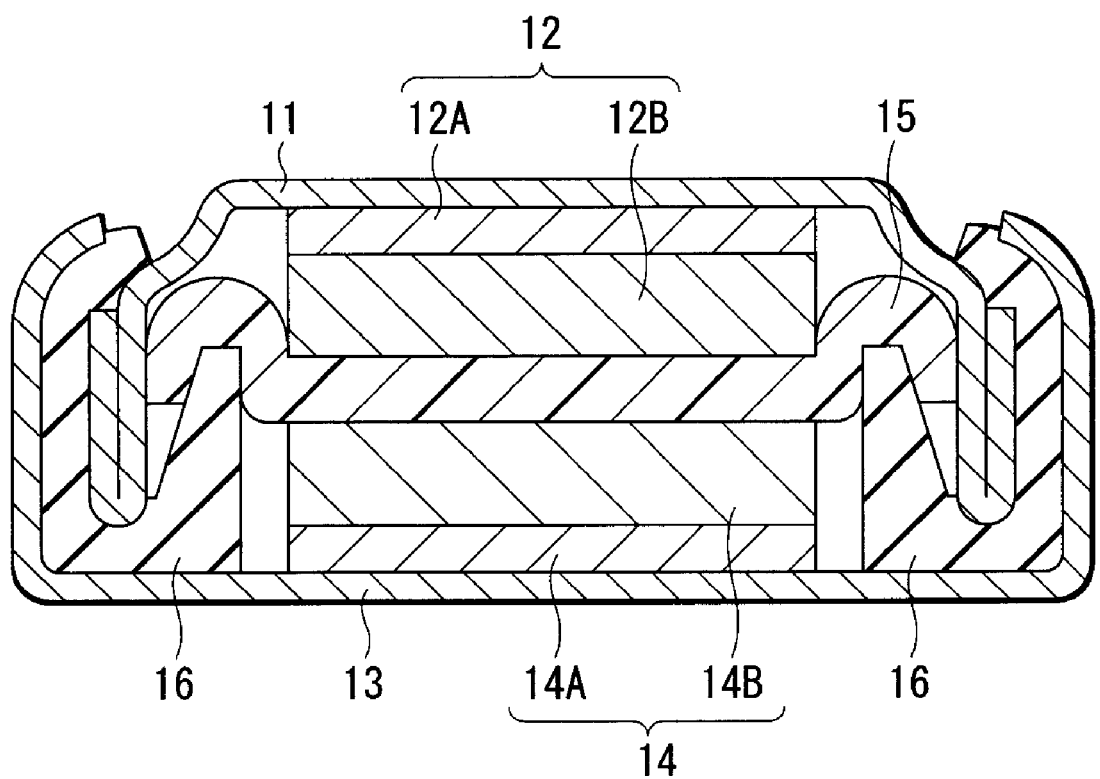
FIG. 1 is a cross section showing a structure of a secondary battery according to a first embodiment of the invention.

FIG. 1 shows a structure of a secondary battery according to a first embodiment of the invention. The secondary battery is a so-called coin type secondary battery in which an anode 12 contained in a package cup 11 and a cathode 14 contained in a package can 13 are layered with a separator 15 impregnated with an electrolytic solution, which is a liquid electrolyte, in between.

Peripheral edges of the package cup 11 and the package can 13 are hermetically sealed by being caulked with an insulating gasket 16. The package cup 11 and the package can 13 are respectively made of a metal such as stainless and aluminum.

The anode 12 has, for example, an anode current collector 12A and an anode active material layer 12B provided on the anode current collector 12A. The anode current collector 12A is preferably made of a metal material containing at least one metal element not forming an intermetallic compound with lithium. When an intermetallic compound is formed with lithium, the anode current collector 12A is expanded and shrunk due to charge and discharge, structural destruction occurs, and current collectivity characteristics are lowered. In addition, ability to support the anode active material layer 12B is lowered, and the anode active material layer 12B is easily dropped from the anode current collector 12A. As a metal element not forming an intermetallic compound with lithium, for example, copper (Cu), nickel (Ni), titanium (Ti), iron (Fe), or chromium (Cr) can be cited.

As a metal material forming the anode current collector 12A, further, a metal material containing a metal element being alloyed with the anode active material layer 12B is preferable. Thereby, contact characteristics between the anode active material layer 12B and the anode current collector 12A can be improved, and the anode active material layer 12B can be prevented from dropping. As described later, when the anode active material layer 12B contains silicon as an element, as a metal element not forming an intermetallic compound with lithium and being alloyed with the anode active material layer 12B, copper, nickel, and iron can be cited. Specially, copper is preferable since copper can provide sufficient strength and sufficient electrical conductivity.

The anode current collector 12A may be composed of a single layer or a plurality of layers. In the latter case, the layer contacting with the anode active material layer 12B may be made of a metal material being alloyed with silicon, and other layers may be made of other metal material.

The surface roughness Ra value of the anode current collector 12A is preferably 0.2 μm or more. Thereby, contact characteristics between the anode active material layer 12B and the anode current collector 12A can be more improved. Further, the surface roughness Ra value of the anode current collector 12A is preferably 5 μm or less. When the surface roughness Ra value is excessively high, the anode current collector 12A may easily suffer some cracks as the anode active material layer 12B is expanded. The surface roughness Ra value means the arithmetic average roughness Ra specified in JIS B0601. It is enough that the surface roughness Ra in at least the region of the anode current collector 12A on which the anode active material layer 12B is provided is in the foregoing range.

The anode active material layer 12B contains silicon as an element. Silicon has a high ability to insert and extract lithium, and provides a high energy density. Silicon may be contained in the form of a simple substance, an alloy, or a compound.

The anode active material layer 12B is preferably formed by, for example, at least one method selected from the group consisting of vapor-phase deposition method, plating method, firing method, and thermal spray method. Thereby, the anode can be prevented from being destructed due to expansion and shrinkage of the anode active material layer 12 associated with charge and discharge, the anode current collector 11 and the anode active material layer 12 can be integrated, and electron conductivity in the anode active material layer 12 can be improved. "Firing method" means a method of forming a layer which has a higher volume density and is denser than before heat treatment by heat treating a layer formed by mixing powders containing an active material and a binder under non-oxidizing atmosphere or the like.

The anode active material layer 12B is preferably alloyed with the anode current collector 12A at least in part of the interface with the anode current collector 12A. As described above, contact characteristics between the anode active material layer 12B and the anode current collector 12A can be thereby improved. Specifically, it is preferable that in the interface, elements of the anode current collector 12A are diffused in the anode active material layer 12B, or elements of the anode active material layer 12B are diffused in the anode current collector 12A, or the both thereof are diffused in each other. In the present invention, the foregoing diffusion of elements is regarded as one form of alloying.

The anode active material layer 12B preferably further contains oxygen as an element. Thereby, the anode active material layer 12B can be prevented from being expanded and shrunk. At least part of oxygen contained in the anode active material layer 12B is preferably bonded to silicon. The bonding state may be silicon monoxide, silicon dioxide, or in other metastable state. The oxygen content in the anode active material layer 12B is preferably 3 atomic % or more, since thereby higher effects can be obtained. Further, the oxygen content in the anode active material layer 12B is preferably 40 atomic % or less. When the oxygen content is excessively large, resistance of the anode 12 is increased and load characteristics are lowered, or the battery capacity is lowered. The anode active material layer 12B does not include a coating on the surface of the anode active material layer 12B which is formed from a decomposed electrolytic solution or the like due to charge and discharge. Therefore, when the oxygen content in the anode active material layer 12B is calculated, oxygen contained in the coating is not included.

In addition, the anode active material layer 12B preferably has a lamination in which a first layer with a smaller oxygen content and a second layer with an oxygen content larger than in the first layer are alternately layered. At least one or more second layers preferably exist between the first layers. Thereby, expansion and shrinkage due to charge and discharge can be effectively prevented. For example, the silicon content in the first layer is preferably 90 atomic % or more. It is possible that oxygen is contained or not contained in the first layer. However, the oxygen content thereof is preferably small as far as possible, and is more preferably 0. Thereby, a higher capacity can be obtained. Meanwhile, in the second layer, the silicon content is preferably 90 atomic % or less, and the oxygen content is preferably 10 atomic % or more. Thereby, structural destruction due to expansion and shrinkage can be more effectively prevented. The first layer and the second layer may be layered in the order of the first layer and the second layer from the anode current collector 12A side, or may be layered in the order of the second layer and the first layer from the anode current collector 12A side. The surface may be the first layer or the second layer. Further, the oxygen content is preferably changed incrementally or continuously between the first layer and the second layer. When the oxygen content is sharply changed, diffusion characteristics of lithium ions may be lowered and the resistance may be increased.

Further, in the secondary battery, the ratio between the capacity of the anode 12 and the capacity of the cathode 14 is adjusted, and thereby the maximum utilization ratio C % of the anode 12 is in the range from 35% to 85%. By setting the maximum utilization ratio C % of the anode 12 to 85% or less, expansion and shrinkage of the anode active material layer 12B due to charge and discharge can be prevented, and the anode active material layer 12B can be prevented from being dropped. Meanwhile, when the maximum utilization ratio C % of the anode 12 is smaller than 35%, side reaction by unused silicon is increased, and the initial charge and discharge efficiency is lowered. In addition, electric potential of the anode 12 in charge state becomes high, and therefore a good quality coating resulting from decomposition of the electrolytic solution is difficult to be formed on the surface of the anode 12, and the side reaction is difficult to be sufficiently prevented. The maximum utilization ratio C % of the anode 12 is more preferably in the range from 40% to 80%. Thereby, higher effects can be obtained.

The maximum utilization ratio C % of the anode 12 is defined by $C=(A/B)\times 100$, where a lithium insertion amount per unit area when the anode 12 is fully charged is A, and a lithium amount capable of being electrochemically inserted per unit area of the anode 12 is B.

Of the foregoing, the lithium insertion amount per unit area when the anode 12 is fully charged, A can be obtained by, for example, disassembling a battery fully charged by a corresponding charger, cutting part of the anode 12 opposed to the cathode 14 as a test anode, assembling an evaluation battery using metal lithium as a counter electrode, performing discharge for the evaluation battery, and dividing the capacity value in the initial discharge by the area of the test anode. In this case, discharge means conducting electricity in the direction of extracting lithium ions from the test anode. The lithium amount capable of being electrochemically inserted per unit area of the anode 12, B can be obtained by, for example, performing discharge for the foregoing evaluation battery, performing constant current and constant voltage charge until the battery voltage becomes 0 V, and dividing the obtained capacity value by the area of the test anode. In this case, charge means conducting electricity in the direction of inserting lithium ions into the test anode. In such an evaluation, in general, a carrying current value is about 1 mA/cm$^2$. Discharge is performed until the battery voltage of the evaluation battery reaches 1.5 V. Charge is performed until the current value becomes 0.05 mA or less in constant voltage charge where the battery voltage is 0 V.

The cathode 14 has, for example, a cathode current collector 14A and a cathode active material layer 14B provided on the cathode current collector 14A. Arrangement is made so that the cathode active material layer 14B side is opposed to the anode active material layer 12B. The cathode current collector 14A is made of, for example, aluminum, nickel, or stainless.

The cathode active material layer 14B contains, for example, as a cathode active material, one or more cathode materials capable of inserting and extracting lithium. The cathode active material layer 14B may contain an electrical conductor such as a carbon material and a binder such as polyvinylidene fluoride according to needs. As a cathode material capable of inserting and extracting lithium, for example, a chalcogenide not containing lithium, or a lithium complex oxide containing lithium can be cited. As a lithium complex oxide, for example, the lithium complex oxide expressed by a general formula of $Li_xMO_2$ is preferable, since thereby a high voltage can be generated and a high energy density can be obtained. M preferably includes one or more transition metal elements, and, for example, preferably includes at least one of cobalt and nickel. x varies according to charge and discharge states of the battery, and is generally in the range of $0.05 \leq x \leq 1.10$. As a specific example of such a lithium containing metal complex oxide, $LiCoO_2$, $LiNiO_2$ or the like can be cited.

The separator 15 separates the anode 12 from the cathode 14, prevents current short circuit due to contact of the both electrodes, and lets through lithium ions. The separator 15 is made of, for example, polyethylene or polypropylene.

An electrolytic solution impregnated in the separator 15 contains, for example, a solvent and an electrolyte salt dissolved in the solvent. The electrolytic solution may contain an additive according to needs. As a solvent, for example, a nonaqueous solvent such as ethylene carbonate, propylene carbonate, dimethyl carbonate, diethyl carbonate, and ethyl methyl carbonate can be cited. One of the solvents may be used singly, or two or more thereof may be used by mixing. For example, when a high-boiling point solvent such as ethylene carbonate and propylene carbonate and a low-boiling point solvent such as dimethyl carbonate, diethyl carbonate and ethyl methyl carbonate are preferably mixed since high ion conductivity can be obtained.

As a solvent, an ester carbonate derivative having halogen atom can be also cited, and is preferably used, since the charge and discharge efficiency can be thereby more improved. In this case, the ester carbonate derivative having halogen atom may be mixed with other solvent as described above, or may be used singly, and may be in the form of a cyclic compound or a chain compound. However the cyclic compound is more preferably used, since higher effect can be thereby obtained. As an example of the cyclic compound, 4-fluoro-1,3-dioxolane-2-one, 4-chloro-1,3-dioxolane-2-one, 4-bromo-1,3-dioxolane-2-one, 4,5-difluoro-1,3-dioxolane-2-one or the like can be cited. Specially, 4-fluoro-1,3-dioxolane-2-one is preferably used, since higher effect can be thereby obtained.

As a solvent, a cyclic ester carbonate having unsaturated bond can be further cited. The cyclic ester carbonate having unsaturated bond is preferably mixed with other solvent, since the charge and discharge efficiency can be thereby more improved. As cyclic ester carbonate having unsaturated bond, 1,3-dioxole-2-one, 4-vinyl-1,3-dioxolane-2-one or the like can be cited.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The battery can be manufactured by, for example, as follows.

First, the anode 12 is formed by forming the anode active material layer 12B on the anode current collector 12A by vapor-phase deposition method, plating method, firing method, or thermal spray method. The anode active material layer 12B may be formed by combining two or more methods of the foregoing. As a vapor-phase deposition method, for example, physical deposition method or chemical deposition method can be cited. Specifically, vacuum vapor deposition method, sputtering method, ion plating method, laser ablation method, CVD (Chemical Vapor Deposition) method and the like can be cited. As a liquid phase deposition method, for example, plating can be cited.

The oxygen content in the anode active material layer 12B is adjusted by, for example, as follows. That is, oxygen is contained in the atmosphere in which the anode active material layer 12B is formed. Otherwise, oxygen is contained in the atmosphere in firing or heat treating the anode active material layer 12B. Otherwise, the oxygen content is adjusted by the oxygen concentration of anode active material particles to be used. In the case that the anode active material layer 12B is formed by alternately layering the first layer with the smaller oxygen content and the second layer with the oxygen content larger than of the first layer as described above, the oxygen content in the anode active material layer 12 may be adjusted as follows. That is, adjustment may be made by changing the oxygen concentration in the atmosphere. Otherwise, it is possible that after the first layer is formed, the surface thereof is oxidized to form the second layer.

It is possible that after the anode active material layer 12B is formed, heat treatment is performed under the vacuum atmosphere or under the non-oxidizing atmosphere, and the interface between the anode current collector 12A and the anode active material layer 12B is further alloyed.

Next, a mixture is prepared by mixing a cathode active material, an electrical conductor, and a binder. The mixture is dispersed in a disperse medium such as N-methyl-2-pyrrolidone to form mixture slurry. The cathode current collector 14A is coated with the mixture slurry, which is compression-molded to form the cathode active material layer 14B. Thereby, the cathode 14 is formed. Then, the amount of the anode active material and the amount of the cathode active material are adjusted so that the maximum utilization ratio C % of the anode 12 becomes in the foregoing range.

Subsequently, for example, the cathode 14, the separator 15 impregnated with the electrolytic solution, and the anode 12 are layered, and the resultant is contained in the package can 13 and the package cup 11, and the package can 13 and the package cup 11 are caulked. Thereby, the secondary battery shown in FIG. 1 is obtained.

In the secondary battery, when charged, for example, lithium ions are extracted from the cathode 14, and inserted in the anode 12 through the electrolytic solution. When discharged, for example, lithium ions are extracted from the anode 12 and inserted in the cathode 14 through the electrolytic solution. Then, since the maximum utilization ratio C % of the anode 12 is 85% or less, the anode active material layer 12B is prevented from being expanded and shrunk, and the anode active material layer 12B is prevented from being dropped. Further, since the maximum utilization ratio C % of the anode 12 is 35% or more, side reaction due to unused silicon is prevented. In addition, the electric potential of the anode 12 in charge state becomes lowered, and a favorable coating is formed on the surface of the anode 12. Therefore, the charge and discharge efficiency is improved.

As above, according to this embodiment, the surface roughness Ra value of the anode current collector 12A is 0.2 μm or more, and the maximum utilization ratio C % of the anode 12 is in the range from 35% to 85%. Therefore, expansion and shrinkage of the anode active material layer 12B can be prevented, and side reaction in the anode 12 can be prevented. Consequently, the charge and discharge efficiency can be improved, and the cycle characteristics can be improved.

Further, when the oxygen content in the anode active material layer 12B is 3 atomic % or more, or when at least one or more second layers with the oxygen content larger than that of the first layer are sandwiched between the first layers, the charge and discharge efficiency can be more improved.

Further, when an ester carbonate derivative having halogen atom is contained in the electrolytic solution, the charge and discharge efficiency can be more improved.

Second Embodiment

Figure 2:
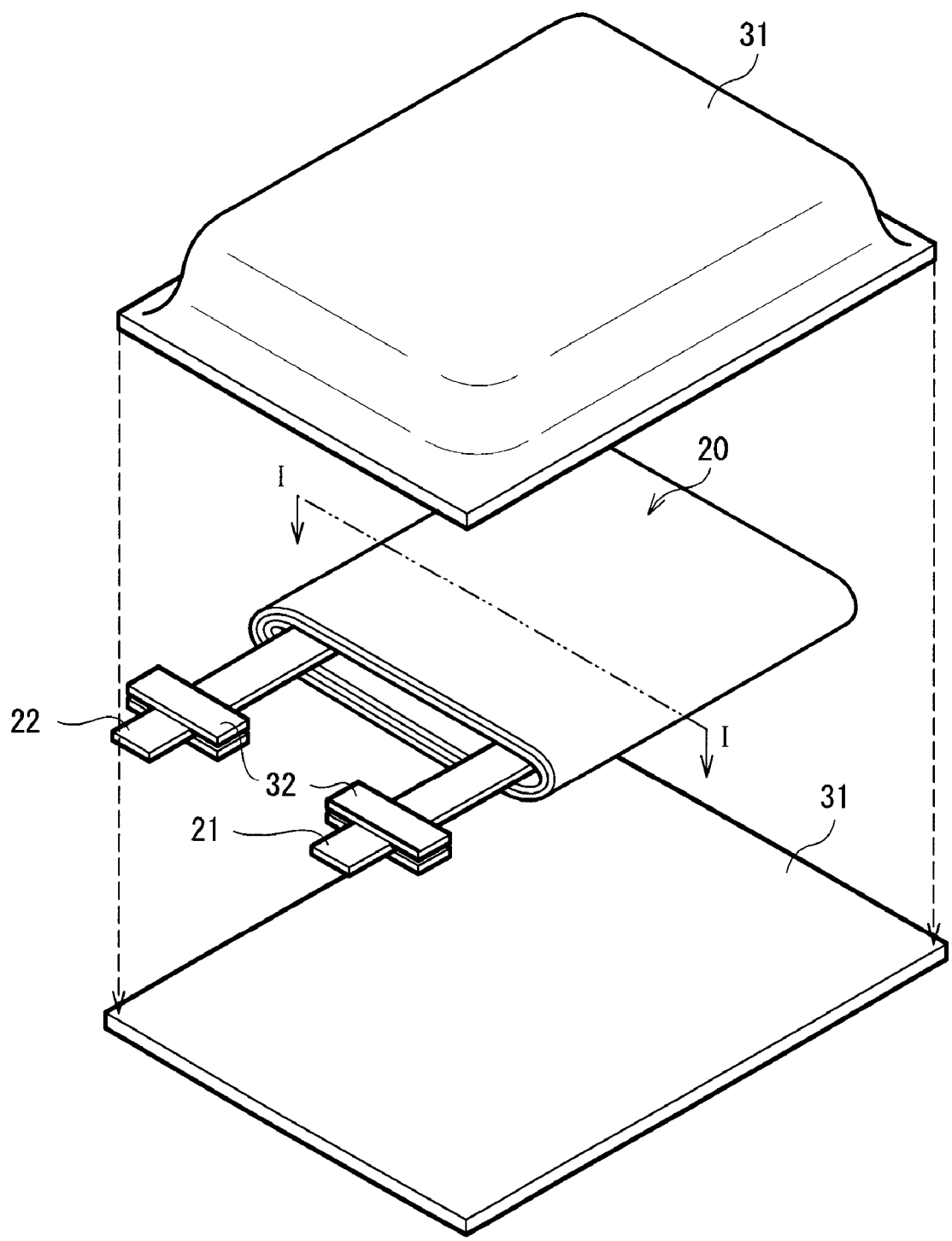
FIG. 2 is a cross section showing a structure of a secondary battery according to a second embodiment of the invention.

FIG. 2 shows a structure of a secondary battery according to a second embodiment of the invention. In the secondary battery, a spirally wound electrode body 20 on which leads 21 and 22 are attached is contained inside a film package member 31. Thereby, a small, light, and thin secondary battery can be obtained.

The leads 21 and 22 are respectively directed from inside to outside of the package member 31 and derived in the same direction, for example. The leads 21 and 22 are respectively made of, for example, a metal material such as aluminum, copper, nickel, and stainless, and are in a state of a thin plate or mesh, respectively.

The package member 31 is made of a rectangular aluminum laminated film in which, for example, a nylon film, an aluminum foil, and a polyethylene film are bonded together in this order. The package member 31 is, for example, arranged so that the polyethylene film side and the spirally wound electrode body 20 are opposed to each other, and the respective outer edges are contacted to each other by fusion bonding or an adhesive. Adhesive films 32 to protect from outside air intrusion are inserted between the package member 31 and the leads 21 and 22. The adhesive film 32 is made of a material having contact characteristics to the leads 21 and 22, for example, a polyolefin resin such as polyethylene, polypropylene, modified polyethylene, and modified polypropylene.

The package member 31 may be made of a laminated film having other structure, a high molecular weight film such as polypropylene, or a metal film, instead of the foregoing aluminum laminated film.

Figure 3:
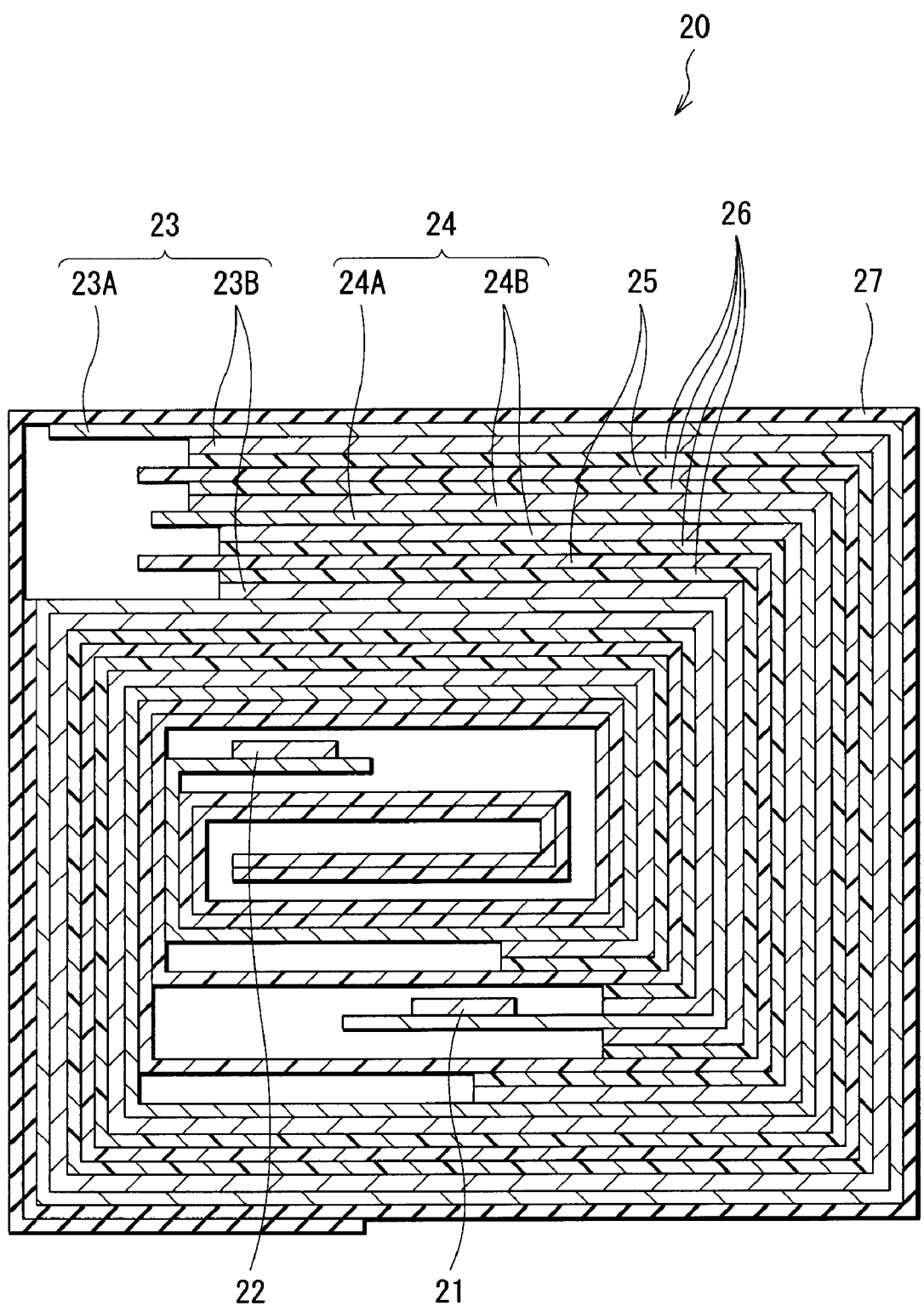
FIG. 3 is a cross section showing a structure taken along line I-I of a spirally wound electrode body shown in FIG. 2.

FIG. 3 shows a cross sectional structure taken along line I-I of the spirally wound electrode body 20 shown in FIG. 2. In the spirally wound electrode body 20, an anode 23 and a cathode 24 are layered with a separator 25 and an electrolyte 26 in between and wound. The outermost periphery thereof is protected by a protective tape 27.

The anode 23 has a structure in which an anode active material layer 23B is provided on the both faces of an anode current collector 23A. The cathode 24 also has a structure in which a cathode active material layer 24B is provided on the both faces of a cathode current collector 24A. Arrangement is made so that the cathode active material layer 24B is opposed to the anode active material layer 23B. The structures of the anode current collector 23A, the anode active material layer 24B, the cathode current collector 24A, the cathode active material layer 24B, and the separator 25 are similar to the structures of the anode current collector 12A, the anode active material layer 12B, the cathode current collector 14A, the cathode active material layer 14B, and the separator 15 in the first embodiment.

The electrolyte 26 is formed of a so-called gelatinous electrolyte in which an electrolytic solution is held in a high molecular weight compound. The structure of the electrolytic solution (that is, a solvent and an electrolyte salt) is similar to that of the first embodiment. As a high molecular weight material, for example, a polymer containing vinylidene fluoride can be preferably cited, since such a polymer has high redox stability. As a high molecular weight compound, a compound formed by polymerizing a polymerizable compound can be further cited. As a polymerizable compound, for example, a compound containing a vinyl group, or a compound containing a group in which part of hydrogen in the vinyl group is substituted with a substitution group such as a methyl group can be cited. Specifically, monofunctional acrylate such as acrylic ester, monofunctional methacrylate such as methacrylic ester, multifunctional acrylate such as diacrylic ester and triacrylic ester, multifunctional methacrylate such as dimethacrylic ester and trimethacrylic ester, acrylic nitrile, or methacrylic nitrile can be cited. Specially, ester having an acrylate group or a methacrylate group is preferable, since when using such ester, polymerization is easily progressed and reactivity of the polymerizable compound is high.

The secondary battery can be manufactured, for example, as follows.

First, after the anode 23 and the cathode 24 are formed in the same manner as in the first embodiment, the electrolyte 26 in which the electrolytic solution is held in the high molecular weight compound is formed on the anode 23 and the cathode 24, respectively. Next, the leads 21 and 22 are attached to the anode current collector 23A and the cathode current collector 24A, respectively. Subsequently, the anode 23 and the cathode 24 are layered with the separator 25 in between to form a lamination. After that, the lamination is wound in the longitudinal direction. The protective tape 27 is adhered to the outermost periphery thereof to form the spirally wound electrode body 20. After that, for example, the spirally wound electrode body 20 is sandwiched between the package members 31, and outer edges of the package members 31 are contacted by thermal fusion bonding or the like to enclose the spirally wound electrode body 20. Then, the adhesive films 32 are inserted between the leads 21, 22 and the package member 31. Thereby, the secondary battery shown in FIGS. 2 and 3 is completed.

The electrolyte 26 may be formed as follows. For example, the anode 23 and the cathode 24 are coated with an electrolytic composition containing a polymerizable compound and an electrolytic solution, and the resultant is spirally wound with the separator 25 in between and enclosed inside the package member 31. After that, the polymerizable compound is polymerized to form the electrolyte 26. Otherwise, the electrolyte 26 may be formed as follows. After the anode 23 and the cathode 24 are spirally wound with the separator 25 in between and enclosed inside the package member 31, an electrolytic composition containing a polymerizable compound and an electrolytic solution is injected into the package member 31, and the polymerizable compound is polymerized to form the electrolyte 26.

The action and effects of the secondary battery are similar to that of the first embodiment.

EXAMPLES

Further, specific examples of the invention will be hereinafter described in detail with reference to the drawings. In the following examples, the symbols used in the foregoing embodiments are directly and correspondingly used.

Examples 1-1 to 1-7

The laminated film type secondary battery shown in FIGS. 2 and 3 was fabricated. First, lithium cobaltate (LiCoO$_2$) as a cathode active material, carbon black as an electrical conductor, and polyvinylidene fluoride as a binder were mixed. The resultant was dispersed in N-methyl-2-pyrrolidone as a disperse medium. After that, the cathode current collector 24A made of an aluminum foil was coated with the resultant, which was dried and thereby the cathode active material layer 24B was formed and the cathode 24 was formed. After that, the lead 22 was attached thereto.

Next, silicon was deposited on the anode current collector 23A made of an electrolytic copper foil having a thickness of 18 µm and the surface roughness Ra value of 0.4 µm by electron beam vapor deposition method. After that, annealing treatment was performed for 24 hours at 280 deg C., and thereby the anode active material layer 23B was formed and the anode 23 was formed. Silicon was deposited while oxygen gas diluted with argon (Ar) was flowed. Further, design was made so that the maximum utilization ratio C of the anode 23 became 50% when the thickness of the anode active material layer 23B was 6 µm, and a desired maximum utilization ratio C could be obtained by changing the thickness of the anode active material layer 23B. After that, the lead 21 was attached thereto.

Subsequently, 5 parts by weight of a polymerizable compound solution and 0.1 parts by weight of a polymerization initiator were mixed with 100 parts by weight of an electrolytic solution to form an electrolytic composition. The polymerizable compound solution was obtained by mixing trimethylolpropane triacrylate shown in Chemical formula 1 and neopentylglycol diacrylate shown in Chemical formula 2 at a weight ratio of trimethylolpropane triacrylate:neopentylglycol diacrylate=3:7. As a polymerization initiator, t-butylperoxyneodecanoate, which is a peroxy ester polymerization initiator, was used. As an electrolytic solution, a mixture of ethylene carbonate (EC) and dimethyl carbonate (DMC) as a solvent at a weight ratio of ethylene carbonate:dimethyl carbonate=3:7, to which LiPF$_6$ as an electrolyte salt was dissolved, was used. The concentration of LiPF$_6$ in the electrolytic solution was 1 mol/l.

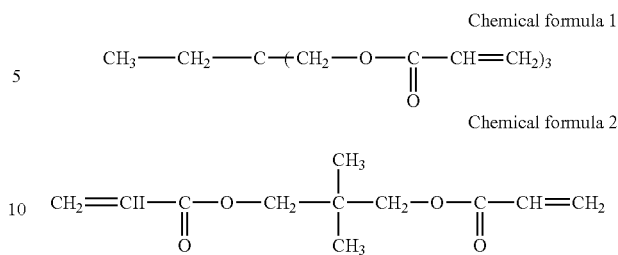

Chemical formula 1

Chemical formula 2

The cathode 24 and the anode 23 were coated with the formed an electrolytic composition. The resultant was contacted with the separator 25 made of a porous polyethylene film being 25 µm thick in between, and wound to obtain a spirally wound body, which was a precursor of the spirally wound electrode body 20.

Next, the spirally wound body was sandwiched between the package members 31 made of a dampproof aluminum laminated film. After that, each outer edge of the package member 31 was bonded together. At that time, the leads 21 and 22 were derived outside of the package member 31. In the aluminum laminated film, a nylon film being 25 µm thick, an aluminum foil being 40 µm thick, and polypropylene being 30 µm thick were layered in the order from the outermost layer. After that, the resultant was sandwiched between glass plates, heated for 30 minutes at 75 deg C. to polymerize the polymerizable compound. Thereby, the electrolytic composition was gelated to form the electrolyte 26 and fabricate the secondary battery.

For the fabricated secondary batteries of Examples 1-1 to 1-7, a lithium insertion amount A per unit volume when the anode 23 was fully charged, and a lithium amount B capable of being electrochemically inserted per unit volume of the anode 23 were measured, and the maximum utilization ratio C of the anode 23 was obtained as described in the embodiment. The results are shown in Table 1.

Further, for the fabricated secondary batteries, charge and discharge test was performed and the initial charge and discharge efficiency and the cycle characteristics were examined. For the charge, constant current and constant voltage charge was performed at a current of 500 mA and at an upper limit voltage of 4.2 V. Discharge was performed at a constant current of 500 mA until the battery voltage reached 2.7 V. The initial charge and discharge efficiency was obtained by a ratio of the initial discharge capacity (discharge capacity at the first cycle) to the initial charge capacity (charge capacity at the first cycle), that is, (initial discharge capacity/initial charge capacity)×100(%). The cycle characteristics were obtained by the ratio of the discharge capacity at the 100th cycle to the discharge capacity at the first cycle, that is, (discharge capacity at the 100th cycle/discharge capacity at the first cycle)× 100(%). The results are shown in Table 1.

Further, for the fabricated secondary batteries, charge and discharge at the first cycle were performed under the foregoing conditions. After that, the secondary batteries were disassembled and the anode 23 was taken out. For the cross section of the anode 23, SEM (Scanning Electron Microscope) image analysis was performed. In the result, it was confirmed that the anode current collector 23A and the anode active material layer 23B were bonded at the interface thereof. Further, for the interface, spot analysis of AES (Auger Electron Spectroscopy) was performed. In the result, it was confirmed that copper which was a component of the anode current collector 23A was diffused in the anode active material layer 23B. That is, it was confirmed that the anode current collector 23A and the anode active material layer 23B were alloyed.

As Comparative examples 1-1 to 1-4 relative to Examples 1-1 to 1-7, secondary batteries were fabricated in the same manner as in Examples 1-1 to 1-7, except that the anode was formed by changing the thickness of the anode active material layer so that the maximum utilization ratio C of the anode became under 35% or over 85%. Further, as Comparative examples 1-5 to 1-7, secondary batteries were fabricated in the same manner as in Examples 1-1 to 1-7, except that an electrolytic copper foil with the surface roughness Ra value of 0.05 μm was used as an anode current collector and the anode was formed by changing the thickness of the anode active material layer so that the maximum utilization ratio C of the anode became in the range from 20% to 90%.

For the fabricated secondary batteries of Comparative examples 1-1 to 1-7, the maximum utilization ratio C of the anode, the initial charge and discharge efficiency and the cycle characteristics were examined in the same manner as in Examples 1-7. The results are shown in Table 1.

Further, for the secondary batteries of Comparative example 1-6, the SEM image analysis was performed for the cross section of the anode in the same manner as in Examples 1-7. In the result, lots of separations were confirmed at the interface between the anode current collector and the anode active material layer.

TABLE 1

| | Surface roughness Ra value (μm) | Maximum utilization ratio C (%) | Initial charge and discharge efficiency (%) | Discharge capacity retention ratio (%) |
|---|---|---|---|---|
| Example 1-1 | 0.4 | 85 | 89 | 81 |
| Example 1-2 | 0.4 | 80 | 88 | 85 |
| Example 1-3 | 0.4 | 75 | 88 | 86 |
| Example 1-4 | 0.4 | 60 | 87 | 87 |
| Example 1-5 | 0.4 | 50 | 87 | 87 |
| Example 1-6 | 0.4 | 40 | 85 | 89 |
| Example 1-7 | 0.4 | 35 | 82 | 84 |
| Comparative example 1-1 | 0.4 | 95 | 90 | 66 |
| Comparative example 1-2 | 0.4 | 90 | 89 | 70 |
| Comparative example 1-3 | 0.4 | 30 | 76 | 80 |
| Comparative example 1-4 | 0.4 | 20 | 74 | 77 |
| Comparative example 1-5 | 0.05 | 90 | 63 | 33 |
| Comparative example 1-6 | 0.05 | 50 | 69 | 29 |
| Comparative example 1-7 | 0.05 | 20 | 53 | 31 |

As evidenced by Table 1, according to Examples 1-1 to 1-7, in which the surface roughness Ra value of the anode current collector 23A was 0.2 μm or more and the maximum utilization ratio C of the anode 23 was in the range from 35% to 85%, the discharge capacity retention ratio was improved more than in Comparative examples 1-1 and 1-2, in which the maximum utilization ratio C of the anode was over 85%, and the initial charge and discharge efficiency was improved more than in Comparative examples 1-3 and 1-4, in which the maximum utilization ratio C of the anode was under 35%. In particular, in Examples 1-2 to 1-6, in which the maximum utilization ratio C of the anode was in the range from 40% to 80%, high values could be obtained.

Meanwhile, in Comparative examples 1-5 to 1-7, in which the surface roughness Ra value of the anode current collector was under 0.2 μm, the discharge capacity retention ratio could not be improved even though the maximum utilization ratio C of the anode was in the range from 35% to 85%.

That is, it was found that when the surface roughness Ra value of the anode current collector 23A was 0.2 μm or more and the maximum utilization ratio C of the anode 23 was in the range from 35% to 85%, the initial charge and discharge efficiency and the cycle characteristics could be improved.

Examples 2-1 to 2-4

Secondary batteries were fabricated in the same manner as in Example 1-5, except that the anode current collector 23A made of an electrolytic copper foil with the surface roughness Ra value of 0.2 μm, 1.0 μm, 3.0 μm, or 5.0 μm was used. At that time, design was made so that the maximum utilization ratio C of the anode 23 was 50%.

As Comparative example 2-1 relative to Examples 2-1 to 2-4, a secondary battery was fabricated in the same manner as in Examples 2-1 to 2-4, except that an anode current collector made of an electrolytic copper foil with the surface roughness Ra value of 0.1 μm was used. At that time, design was made so that the maximum utilization ratio C of the anode was 50%.

For the fabricated secondary batteries of Examples 2-1 to 2-4 and Comparative example 2-1, the initial charge and discharge efficiency and the cycle characteristics were examined in the same manner as in Examples 1-1 to 1-7. The results are shown in Table 2 together with the results of Example 1-5 and Comparative example 1-6.

TABLE 2

| | Surface roughness Ra value (μm) | Maximum utilization ratio C (%) | Initial charge and discharge efficiency (%) | Discharge capacity retention ratio (%) |
|---|---|---|---|---|
| Example 2-1 | 0.2 | 50 | 83 | 80 |
| Example 1-5 | 0.4 | 50 | 87 | 87 |
| Example 2-2 | 1.0 | 50 | 86 | 88 |
| Example 2-3 | 3.0 | 50 | 86 | 89 |
| Example 2-4 | 5.0 | 50 | 87 | 85 |
| Comparative example 1-6 | 0.05 | 50 | 69 | 29 |
| Comparative example 2-1 | 0.1 | 50 | 72 | 54 |

As evidenced by Table 2, according to Examples 1-5 and 2-1 to 2-4, in which the surface roughness Ra value of the anode current collector 23A was 0.2 μm or more, the initial charge and discharge efficiency and the discharge capacity retention ratio were significantly improved.

That is, it was found that the surface roughness Ra value of the anode current collector 23A was preferably 0.2 μm or more.

Examples 3-1 to 3-6

Secondary batteries were fabricated in the same manner as in Example 1-5, except that the oxygen content in the anode active material layer 23B was changed by appropriately changing flow conditions of oxygen gas diluted with argon when silicon was deposited. At that time, design was made so that the maximum utilization ratio C of the anode 23 was 50%.

As Comparative example 3-1 relative to Examples 3-1 to 3-6, a secondary battery was fabricated in the same manner as in Examples 3-1 to 3-6, except that an anode current collector made of an electrolytic copper foil with the surface roughness Ra value of 0.05 μm was used and the flow conditions of oxygen gas diluted with argon were changed.

For the fabricated secondary batteries of Examples 3-1 to 3-6 and Comparative example 3-1, the initial charge and discharge efficiency and the cycle characteristics were examined in the same manner as in Examples 1-1 to 1-7. The results are shown in Table 3 together with the results of Example 1-5 and Comparative example 1-6.

Further, charge and discharge at the first cycle were performed for the secondary batteries of Examples 1-5, 3-1 to 3-6 and Comparative examples 1-6 and 3-1 under the conditions similar to of Examples 1-1 to 1-7. After that, the secondary batteries were disassembled to take out the anode 23, and the oxygen content in the anode active material layer 23B was measured by an oxygen concentration analyzer. At that time, the surface of the anode 23 was washed with diethyl carbonate, and the coating formed on the surface was removed. The results are shown in Table 3.

TABLE 3

|  | Surface roughness Ra value (μm) | Maximum utilization ratio C (%) | Oxygen content (atomic %) | Initial charge and discharge efficiency (%) | Discharge capacity retention ratio (%) |
|---|---|---|---|---|---|
| Example 1-5 | 0.4 | 50 | 1.5 | 87 | 87 |
| Example 3-1 | 0.4 | 50 | 2 | 87 | 88 |
| Example 3-2 | 0.4 | 50 | 3 | 88 | 91 |
| Example 3-3 | 0.4 | 50 | 7 | 88 | 92 |
| Example 3-4 | 0.4 | 50 | 11 | 87 | 93 |
| Example 3-5 | 0.4 | 50 | 32 | 85 | 90 |
| Example 3-6 | 0.4 | 50 | 40 | 83 | 88 |
| Comparative example 1-6 | 0.05 | 50 | 1 | 69 | 29 |
| Comparative example 3-1 | 0.05 | 50 | 7 | 51 | 39 |

As evidenced by Table 3, according to Examples 1-5 and 3-1 to 3-6, there was a tendency as follows. That is, as the oxygen content in the anode active material layer 23B was increased, the initial charge and discharge efficiency, and the discharge capacity retention ratio were improved, showed the maximum value, and then were lowered. Meanwhile, according to Comparative examples 1-6 and 3-1, in which the surface roughness Ra value was under 0.2 μm, when the oxygen content in the anode active material layer was increased, the discharge capacity retention ratio was improved, but the initial charge and discharge efficiency was significantly lowered, and the value of the initial charge and discharge efficiency was not sufficient.

That is, it was found that it was more preferable that the anode current collector 23A with the surface roughness Ra value of 0.2 μm or more was used, and the oxygen content in the anode active material layer 23B was 3 atomic % or more.

Examples 4-1 to 4-4

Secondary batteries were fabricated in the same manner as in Example 3-4, except that the anode active material layer 23B was formed by alternately layering the first layer with a smaller oxygen content and the second layer with a larger oxygen content. The first layer was formed by electron beam deposition. The second layer was formed by stopping depositing the first layer and oxidizing the surface of the first layer by flowing oxygen gas diluted with argon. In Example 4-1, film forming was made in the order of the first layer, the second layer, and the first layer. In Example 4-2, three layers of the first layer and three layers of the second layer were layered in the order of the first layer and the second layer, and the first layer was further formed thereon. In Example 4-3, five layers of the first layer and five layers of the second layer were layered in the order of the first layer and the second layer, and the first layer was further formed thereon. In Example 4-4, ten layers of the first layer and ten layers of the second layer were layered in the order of the first layer and the second layer, and the first layer was further formed thereon. The total oxygen content in the anode active material layer 23B was about 11 atomic % similarly to in Example 3-4, and design was made so that the maximum utilization ratio C of the anode 23 became 50%.

For the fabricated secondary batteries of Examples 4-1 to 4-4, the initial charge and discharge efficiency and the cycle characteristics were examined in the same manner as in Examples 1-1 to 1-7. The results are shown in Table 4 together with the results of Example 3-4.

TABLE 4

|  | Surface roughness Ra value (μm) | Maximum utilization ratio C (%) | Second layer | | Initial charge and discharge efficiency (%) | Discharge capacity retention ratio (%) |
|---|---|---|---|---|---|---|
|  |  |  | Number of layers | Oxygen (atomic %) |  |  |
| Example 3-4 | 0.4 | 50 | 0 | 11 | 87 | 93 |
| Example 4-1 | 0.4 | 50 | 1 | 11 | 88 | 95 |
| Example 4-2 | 0.4 | 50 | 3 | 11 | 90 | 96 |
| Example 4-3 | 0.4 | 50 | 5 | 11 | 90 | 97 |
| Example 4-4 | 0.4 | 50 | 10 | 11 | 91 | 98 |

As evidenced by Table 4, according to Examples 4-1 to 4-4, in which the first layer and the second layer were provided, the initial charge and discharge efficiency, and the discharge capacity retention ratio were improved compared to in Example 3-4 having no first layer and second layer. Further, there was a tendency as follows. That is, as the number of layers was increased, both the initial charge and discharge efficiency, and the discharge capacity retention ratio were improved. That is, it was found that it was more preferable that at least one or more second layers with the large oxygen content were provided between the first layers with the small oxygen content.

Example 5-1

A Secondary battery was fabricated in the same manner as in Example 1-5, except that 4-fluoro-1,3-dioxolane-2-one (FEC), which was an ester carbonate derivative having halogen atom, was used instead of ethylene carbonate.

As Comparative example 5-1 relative to Example 5-1, a secondary battery was fabricated in the same manner as in Example 5-1, except that as an anode current collector, an electrolytic copper foil with the surface roughness Ra value of 0.05 μm was used. At that time, design was made so that the maximum utilization ratio C of the anode was 50%.

For the fabricated secondary batteries of Example 5-1 and Comparative example 5-1, the initial charge and discharge efficiency, and the cycle characteristics were examined in the same manner as in Examples 1-1 to 1-7. The results are shown in Table 5 together with the results of Example 1-1 and Comparative example 1-6.

TABLE 5

| | Surface roughness Ra value (μm) | Maximum utilization ratio C (%) | Solvent | Initial charge and discharge efficiency (%) | Discharge capacity retention ratio (%) |
| --- | --- | --- | --- | --- | --- |
| Example 1-5 | 0.4 | 50 | EC + DEC | 87 | 87 |
| Example 5-1 | 0.4 | 50 | FEC + DEC | 87 | 90 |
| Comparative example 1-6 | 0.05 | 50 | EC + DEC | 69 | 29 |
| Comparative example 5-1 | 0.05 | 50 | FEC + DEC | 65 | 35 |

EC: ethylene carbonate
DEC: diethyl carbonate
FEC: 4-fluoro-1,3-dioxolane-2-one

As evidenced by Table 5, according to Example 5-1 using 4-fluoro-1,3-dioxolane-2-one, the discharge capacity retention ratio was improved more than in Example 1-5 not using 4-fluoro-1,3-dioxolane-2-one. Meanwhile, according to Comparative example 5-1, in which the surface roughness Ra value in the anode current collector was 0.05 and 4-fluoro-1,3-dioxolane-2-one was used, the discharge capacity retention ratio was improved more than in Comparative example 1-6 not using 4-fluoro-1,3-dioxolane-2-one, but the initial charge and discharge efficiency was lowered.

That is, it was found that when the anode current collector with the surface roughness Ra value of 0.2 μm or more was used, and the cyclic ester carbonate derivative having halogen atom was used, the cycle characteristics could be further improved while the high initial charge and discharge efficiency was maintained.

The invention has been described with reference to the embodiments and the examples. However, the invention is not limited to the foregoing embodiments and the foregoing examples, and various modifications may be made. For example, in the foregoing embodiments and the foregoing examples, descriptions have been given of the case using the electrolytic solution or the gelatinous electrolyte in which an electrolytic solution is held in a high molecular weight compound as an electrolyte. However, other electrolyte may be used. As other electrolyte, an inorganic conductor containing lithium nitride, lithium phosphate or the like, a high molecular weight solid electrolyte in which an electrolyte salt is dispersed in a high molecular weight compound having ion conductivity, a mixture of the foregoing and an electrolytic solution and the like can be cited.

Further, in the foregoing embodiments and the foregoing examples, descriptions have been given of the coin type secondary battery or the spirally wound laminated type secondary battery. However, the invention can be similarly applied to a secondary battery such as a cylinder type battery, a square type battery, a button type battery, a thin type battery, a large type battery, and a lamination type battery. In addition, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:
1. A lithium ion battery comprising:
a cathode;
an anode; and
an electrolyte,
wherein,
the anode includes an anode current collector and an anode active material layer on the anode current collector, and
said anode active material layer includes oxygen (O) and silicon (Si),
said anode current collector has a surface roughness Ra value of 0.2 μm or more,
said anode active material layer is alloyed with said anode current collector at least in part of the interface with the anode current collector,
when said anode is fully charged a lithium (Li) insertion amount per unit area is A,
a lithium amount capable of being electrochemically inserted per unit area of the anode is B, and the maximum utilization ratio C % of said anode is (A/B)×100, the maximum utilization ratio C % is in the range from 40 to 80.

2. The lithium ion battery according to claim 1, wherein an oxygen content in the anode active material layer is 3 atomic % or more.

3. The lithium ion battery according to claim 2, wherein at least part of oxygen contained in the anode material layer is bonded to silicon.

4. The lithium ion battery according to claim 2, wherein said anode active material layer includes a first layer having an oxygen content, and at least one second layer on said first layer having an oxygen content greater than the oxygen content of said first layer.

5. The lithium ion battery according to claim 1, wherein the electrolyte contains an ester carbonate derivative having halogen atom.

6. The lithium ion battery according to claim 4 wherein said anode active material layer includes a plurality of layers where said first layer alternates with at least one second layer.

* * * * *